US012655071B2

(12) United States Patent　　　　(10) Patent No.:　US 12,655,071 B2
Vuolo et al.　　　　　　　　　　　　(45) Date of Patent:　　Jun. 16, 2026

(54) COMPOSITION FOR BIO STIMULATION OF PLANTS

(71) Applicant: SACCO SRL, Cadorago (IT)

(72) Inventors: Francesco Vuolo, Cadorago (IT);
Martin Pedersen, Cadorago (IT);
Adriano Altissimo, Cadorago (IT)

(73) Assignee: SACCO SRL, Cadorago (IT)

( * ) Notice: Subject to any disclaimer, the term of this
patent is extended or adjusted under 35
U.S.C. 154(b) by 554 days.

(21) Appl. No.: 18/034,095

(22) PCT Filed: Nov. 8, 2021

(86) PCT No.: PCT/EP2021/080974
§ 371 (c)(1),
(2) Date: Apr. 27, 2023

(87) PCT Pub. No.: WO2022/096723
PCT Pub. Date: May 12, 2022

(65) Prior Publication Data
US 2024/0018063 A1　　Jan. 18, 2024

(30) Foreign Application Priority Data
Nov. 9, 2020　(NL) ..................................... 2026852

(51) Int. Cl.
*C05F 11/08*　　　(2006.01)
*C05G 1/00*　　　(2006.01)
*C05G 5/23*　　　(2020.01)
(52) U.S. Cl.
CPC ............... *C05F 11/08* (2013.01); *C05G 1/00*
(2013.01); *C05G 5/23* (2020.02)

(58) Field of Classification Search
CPC ... C05F 11/08; C05F 1/00; C05G 1/00; C05G
5/23; C05B 7/00
See application file for complete search history.

(56) References Cited

U.S. PATENT DOCUMENTS

| | | | |
|---|---|---|---|
| 3,714,063 A | 1/1973 | Salomone | |
| 2006/0115883 A1* | 6/2006 | Bramucci | ................ C12N 9/88 |
| | | | 435/252.1 |
| 2011/0009262 A1 | 1/2011 | Soejima | |
| 2016/0174549 A1 | 6/2016 | Sanders | |
| 2020/0102581 A1* | 4/2020 | Alphandery | .............. C12P 3/00 |

FOREIGN PATENT DOCUMENTS

| | | |
|---|---|---|
| CN | 107365725 A | 11/2017 |
| CN | 107926607 A | 4/2018 |

OTHER PUBLICATIONS

International Search Report and Written Opinion for Application
No. PCT/EP2021/080974, mailed Feb. 1, 2022, 14 pages.

* cited by examiner

*Primary Examiner* — Jennifer A Smith
(74) *Attorney, Agent, or Firm* — KDW Firm PLLC

(57)　　　　　　ABSTRACT

A composition for bio stimulation of plants, more specifi-
cally to a composition for bio stimulation of plants derived
from the fermentation effluent of lactic acid bacteria (LAB)
including bifidobacteria. A use of the composition for the
bio-stimulation of plants and a method for the bio stimula-
tion of plants being provided with the composition.

11 Claims, 4 Drawing Sheets

Figure 1:
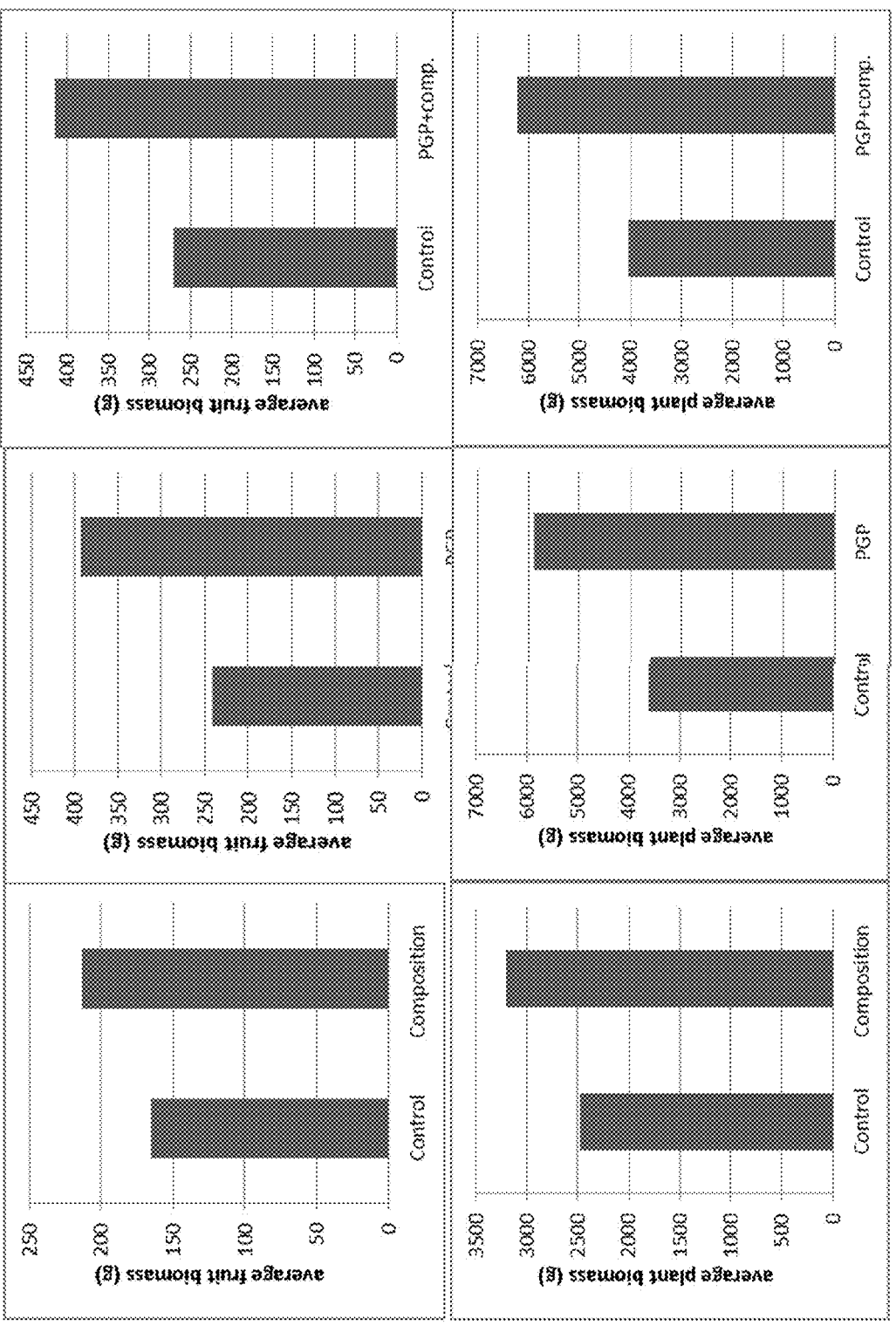

A.

B.

A.

B.

COMPOSITION FOR BIO STIMULATION OF PLANTS

This application is a national stage filing under 35 U.S.C. 371 of pending International Application No. PCT/EP2021/ 080974, filed Nov. 8, 2021, which claims priority to Netherlands Patent Application No. 2026852, filed Nov. 9, 2020, the entirety of which applications are incorporated by reference herein.

The present invention relates to a composition for bio stimulation of plants, more specifically to a composition for bio stimulation of plants derived from the fermentation effluent of lactic acid bacteria (LAB) including bifidobacteria. The present invention further relates to the use of the composition for the bio-stimulation of plants and a method for the bio stimulation of plants being provided with the composition.

Over the last 100 years, agriculture has become considerably more efficient, improving production systems, enhancing crop efficiency and disease resistance that has resulted in significant increases in food production. Conventional agriculture provides more than 90% of food production in the world but is highly resource intensive, even fully depleting resources locally with increasing damage to flora and fauna worldwide. Food production is stagnating and in many areas declining, affected by pollution, an increasing carbon footprint, declining soil quality (degradation, nutrient loss, and erosion), water scarcity, salinity and loss of biodiversity. Furthermore, an increasing population and higher wealth standard worldwide provides todays agriculture with challenges to produce at improved yield per square meter ($m^2$) and cope with the rising food demand, leading to an increase in the related indicated problems. Agriculture needs to be more efficient and be able to counter resource-scarcity and in addition to preserve soils, water and global health.

Several attempts have been made to provide (partial) solutions to target these challenges and to tackle the problems associated with the worlds increasing demand for food. For example, the use of herbicides and pesticides has been one of the main factors in the rising productivity of agriculture in recent decades. However, intensified use of chemical products in agriculture is becoming a problem in view of public health and environmental issues related to the use of these chemical products, especially in relation to long-term negative effects. Substitution (or supplementation) of traditional fertilizers, pesticides, and fungicides by biological plant efficiency stimulators reduces pollution of soil and ground- and surface waters. Plant efficiency enhancement products or bio stimulants enable organic agriculture to become more profitable due to better quality and higher yields and to better preserve soil quality.

Another, more recent development is the use of bacteria to boost crop production. More specifically, plant growth promoting bacteria (PGPB) are known to improve plant performance due to the natural production of plant beneficial metabolites, such as the production of hormones (phytohormones), the enhancers of plant nutritional status (phosphate-solubilizers; iron-chelating agents; organic acids), plant pathogen-targeting inhibitors, and the reduction of the stress-related damage. The interaction between plants and PGPB becomes of particular interest in environments that are characterized by suboptimal growth conditions, e.g., high or low temperatures, drought, soil salinity, and nutrient reduction or scarcity. Therefore, PGPB are important consideration in the future agriculture. However, the commercialization and utilization of PGPB has currently been limited due to inconsistent responses in different crops, and the limited knowledge about these bacteria and how to put them into use.

In view of the occurring climate change problem, causing agricultural lands to dry out and being deprived of its nutrients, there is a need for more eco-sustainable agriculture and to provide similar or even increased crop production using less water, less nutritional resources, and preferably without use of synthetic chemical compounds. In addition, there is a need in the art for products and methods for improving the carbon footprint, i.e. in a sustainable matter, of the cultivation of plants for food production to cope with the present climate change problems.

Considering the above, there is a need in the art for organically produced agricultural products that increase the efficiency of water usage of crops and to reduce irrigation and use of chemical commodities to boost crops production. In addition, there is a need in the art for method for improving drought tolerance by plants using organic agricultural products to cope with the present climate change problem, agricultural lands drying out and being deprived of resources, in combination with water becoming an increasingly scares resource and precious commodity.

It is an object of the present invention, amongst other objects, to address the above need in the art. The object of present invention, amongst other objects, is met by the present invention as outlined in the appended claims.

Specifically, the above object, amongst other objects, is met, according to a first aspect, by the present invention by a composition for bio stimulation of plants, wherein the composition is an aqueous solution comprising between 5 to 30 wt %, preferably 9 to 20 wt %, more preferably 10 to 18 wt % lactic acid, between 0.05 to 2 wt %, preferably 0.1 to 1 wt %, more preferably 0.2 to 0.5 wt % of potassium or potassium based compounds, and between 2 to 10 wt %, preferably 3 to 8 wt %, more preferably 4 to 6 wt % of ammonium or ammonium comprising compounds, and between 0.2 to 5 wt %, preferably 0.4 to 4 wt %, more preferably 0.5 to 3.5 wt % of phosphate or phosphate comprising compounds, based on the total weight of the composition, and wherein the composition is derived from the fermentation effluent of lactic acid bacteria (LAB). The composition of present invention is derived from a crude LAB eluent stream that is concentrated to provide a composition as defined above and makes this composition available for transport and agronomic application. Experiments have shown that for lettuce, tomato, and soybean plants that have been cultivated in the presence of the specified composition show an increase in biomass, an improved tolerance to drought and improved resistance in periods of cultivation, also under conditions were there was a reduced nutrient availability. Experiments have further shown that the fermentation effluents of LAB are often too concentrated and harmful to be supplied "as they are" to the plants to achieve the desired bio stimulation. In fact, the osmotic potential or even toxicity levels of the different compounds are too high for plant roots. The present composition provides an optimal concentration such that it did not affect negatively the plant's fitness and provided beneficial effects on the plant's growth; showing bio stimulation in lettuce, tomato and soybean improving the stress recovery, and drought amelioration. The bio stimulation provided by the composition of the present invention is one or more selected from the group consisting of improved plant growth, improved crop growth, increased drought tolerance, improved stress recovery, as compared to a plant not provided with the composition of present invention.

According to a preferred embodiment, the present invention relates to the composition, wherein the composition is further comprised of between 0.1 to 1 g/kg, preferably 0.2 to 0.9 g/kg, more preferably 0.3 to 0.8 g/kg calcium, and/or between 0.07 to 0.2 mg/kg, preferably 0.1 to 0.17 mg/kg, more preferably 0.12 to 0.15 mg/kg iron, and/or between 0.06 to 0.16 mg/kg, preferably 0.08 to 0.15 mg/kg, more preferably 0.1 to 0.13 mg/kg tryptophan, based on the total weight of the composition. Experiments have shown that when the indicated trace elements are also present in the composition within the specified ranges, the bio-stimulatory effect on plants is further improved.

The composition of the present invention originates from the fermentation effluent of lactic acid bacteria and is concentrates as such to provide a composition that can be applied to plants to provide bio-stimulation to said plant. Lactic acid bacteria (LAB) are an order of gram-positive, rod-shaped or spherical bacteria that are found in for example fermented milk products and decomposing (fermenting) plants. LAB are often used in food production, e.g. bakery or dairy product, and have a generally recognized as safe (GRAS) status, due to this ubiquitous appearance in food and their contribution to the healthy microbiota of animal and human mucosal surfaces. LAB are often used in probiotic or nutraceutical products aimed at delivering living, beneficial, bacterial cells to the gut ecosystem of humans and animals. The effluent during the fermentation process using LAB is often regarded as a waste product and therefore considered as invaluable and discarded, which may even infer a cost for the producer. At present, no use has been made of a composition comprising an optimal concentrated LAB effluent for the bio-stimulation plant health or plant growth in agriculture.

The LAB industrial fermentation processes produce vast quantities of spent media, with an underestimated richness in nutritious compounds and secondary metabolites. These mixtures represent a good integration and a very useful solution for the agricultural sector. The composition of the present invention exploits the effluent of the LAB fermentation process to improve plant's health and nutrition. The composition creates a new biological product for agricultural use, reducing and/or integrating the application of synthetic products, whose long-term treatment on plants showed to be detrimental for the environment. The composition of the present invention originating from LAB spent fermentation media is a valuable source of nutritive elements for plants within a specific diluted or concentrated range, as they contain a substantial source of nitrogen (or NH4+ groups, available for plant nutrition), potassium, phosphates, organic acids, which can bind and solubilize useful nutrients in the soil, available in the composition making it available for root absorption and such that the osmotic potential or even toxicity levels of the different compounds are optimal for uptake by the plant roots.

LAB share common metabolic and physiological characteristics which is characterized by an increased tolerance to acidity and production of lactic acid, and in some cases acetic acid, as the major metabolic end product of fermentation which in turn, due to acidification, inhibits the growth of many other organism, such as pathogens. Furthermore, a multitude of other useful metabolites is often present in the composition, such as phytohormones to restrict the growth of plant pathogens. Proteinaceous bacteriocins are produced by several LAB strains and provide an additional hurdle for spoilage and pathogenic microorganisms.

According to another preferred embodiment, the present invention relates to the composition, wherein the composition further comprises one or more substances selected from the group consisting of di-ketopiperazines, 3-phenyllactate, bacteriocins, 3-Phenylpropanoicacid, (E)-2-Methylcinnamic acid, cytidine, deoxycytidine, sodiumdecanoate, cyclo(L-Met-L-Pro), cyclo(L-Pro-L-Pro), cyclo(L-Tyr-L-Pro) and cyclo(L-His-L-Pro), hydrogen peroxide, pyrrolidone-5-carboxylic acid, diacetyl, and reuterin, preferably di-ketopiperazines. Although LAB mainly produce organic acids that attributes to foliar bacterial pathogen control in plants, the LAB also produce during the fermentation process, as a side effect of the acidification process, a diversity of antimicrobial and bio stimulant compounds. These include antifungal substance like 3-Phenylpropanoicacid, (E)-2-Methylcinnamic acid, cytidine, deoxycytidine, sodiumdecanoate, cyclo(L-Met-L-Pro), cyclo(L-Pro-L-Pro), cyclo(L-Tyr-L-Pro) and cyclo(L-His-L-Pro), antifungal diketopiperazines, hydroxy derivatives of fatty acids, 3-phenyllactate; antibacterial bacteriocins and bacteriocin-like compounds; and general antimicrobials such as organic acids, hydrogen peroxide, pyrrolidone-5-carboxylic acid, diacetyl and reuterin.

According to yet another preferred embodiment, the present invention relates to the composition, wherein the composition further comprises plant growth promoting bacteria (PGPB) selected from the group consisting of *Azospirillum, Paraburkholderia, Methylobacterium, Rhizobacteria, Gluconacetobacter, Burkholderia, Klebsiella, Azoarcus, Bacillus, Pseudomonas*, preferably *Azospirillum, Paraburkholderia* or *Methylobacterium*. Plant growth-growth promoting bacteria (PGPB) promote plant growth by producing compounds that directly stimulate plant growth or withstand biotic and abiotic stress, improve nutrient acquisition, and act as biocontrol agents. PGPB are associated with many plant species, which colonize the root surfaces and the closely adhering soil interface, the rhizosphere. Inside the rhizosphere is a zone where bacteria, fungi, and other organisms compete for nutrients and for binding to the root structures of the plant. Both detrimental and beneficial bacteria can occupy the plant roots. The presence of PGPB within or near these roots or seeds can lead to a healthier rhizosphere environment and healthier plants. The free-living bacteria not associated with the plant roots, are deemed to promote plant growth in agricultural crops and lead to increased growth and yield at harvest. Several growth-promoting mechanisms are known and for example supply the plant with nutrients through e.g. phosphate solubilisation and transport towards the roots and atmospheric nitrogen fixation, or synthesizing phytohormones. As an additional advantage, PGPB can also lead to extensive remodelling of the plant root systems. Experiments have shown that a combination between the composition of present invention and PGPB provides a synergistic bio stimulant effect on the plant health, increase crop output and improve plant growth. In all the tests with lettuce, tomato and soybean performed, the combination showed similar positive effect on plant growth and fitness, and especially in lettuce and soybean, the combined use of PGPB and composition showed a clear synergistic effect.

According to a preferred embodiment, the present invention relates to the composition, wherein the composition is free of added synthetic products, such as synthetic fertilizers, pesticides, herbicides or fungicides. One goal of present invention is to provide a bio stimulant effect to the plant and to boost crop production while reducing the use of chemical and synthetic commodities such as pesticides.

According to a preferred embodiment, the present invention relates to the composition, wherein the fermentation effluent of lactic acid bacteria is derived from a submerged fermentation process. As fermentation medium for the lactic acid bacteria fermentation, most broths useful for growth of LAB can be used. For example an MRS broth can be used that generally comprises dipotassium hydrogen phosphate, glucose, magnesium sulfate heptahydrate, manganous sulfate tetrahydrate, meat extract, peptone, sodium acetate trihydrate, triammonium citrate, and yeast extract. Generally, an industrial LAB liquid fermentation medium may comprise 1-3% of peptone; 0.4-3% yeast extract; 2-6% glucose; 0.5-1% sodium acetate trihydrate; 0.2-0.5% dipotassium hydrogen phosphate; 0.1% triammonium citrate; 0.02-0.04% magnesium sulfate heptahydrate; 0.005% manganese sulfate tetrahydrate; 0.002% iron sulfate, bases on the total weight of the liquid medium.

According to a preferred embodiment, the present invention relates to the composition, wherein the lactic acid bacteria are one or more selected from the group consisting of *Streptococcus, Lactococcus, Lactobacillus, Bifidobacterium, Lactobacillus, Leuconostoc, Pediococcus, Aerococcus, Carnobacterium, Enterococcus, Oenococcus, Sporolactobacillus, Tetragenococcus, Vagococcus*, and *Weissella*, preferably mixtures thereof. *Lactobacillus, Lactococcus, Bifidobacterium*, and *Streptococcus* species, are most frequently used in LAB processes as demanded by the market, customers and more recurrent in the dairy and nutraceutical applications. The presence of different strains can influence the desirability of available substances and enzymes present in the effluent obtained after the LAB fermentation process, such as di-ketopiperazines, glycosidases, esterases, phenolic acid decarboxylases.

The present invention, according to a second aspect, relates to a method for the bio stimulation of plants, wherein the plants are being provided with the composition of present invention.

According to a preferred embodiment, the present invention relates to the method, wherein the composition is provided to the plants via foliar or soil application, preferably soil application. Data shows that both modes of application are effective in providing the biostimulant effect. However, soil application seems to be more preferred and effective as mode of application.

According to a preferred embodiment, the present invention relates to the method, wherein the composition is substantially free of live lactic acid bacteria and/or further comprises inactivated lactic acid bacteria before being provided to the plants.

According to a preferred embodiment, the present invention relates to the method, wherein the plant is one or more selected from the group consisting of lettuce, tomato, soybean, corn, pepper, cabbage, preferably lettuce, tomato, and soybean.

According to a preferred embodiment, the present invention relates to the method, wherein the bio stimulation is one or more selected from the group consisting of improved plant growth, improved crop growth, increased drought tolerance, improved stress recovery, as compared to a plant not provided with the composition of present invention.

The present invention, according to a second aspect, relates to the use of the composition of present invention for the bio stimulation of plants. The bio stimulation of plants is one or more selected from the group consisting of improved plant growth, improved crop growth, increased drought tolerance, improved stress recovery, as compared to a plant not provided with the composition of present invention.

The present invention will be further detailed in the following examples and figures wherein:

FIG. 1: shows the efficacy of the composition of the present invention on tomato plant's growth in terms of total plant biomass (upper graphs) and total fruit biomass (lower graphs). Plants were treated with the composition of the present invention, plant growth promoting (PGP) bacteria or with both. When the composition of present invention was applied to the tomato plants, the overall biomass of the plants increased. In the case where the composition of present invention was combined with PGP's a synergistic effect was observed wherein the plant biomass was increased more than when PGP or the composition of present invention was added separately. Looking at the fruit biomass, also a similar trend was observed where the composition of present invention resulted in a significant increase in fruit biomass, and even greater when combined with PGP.

Figure 2:
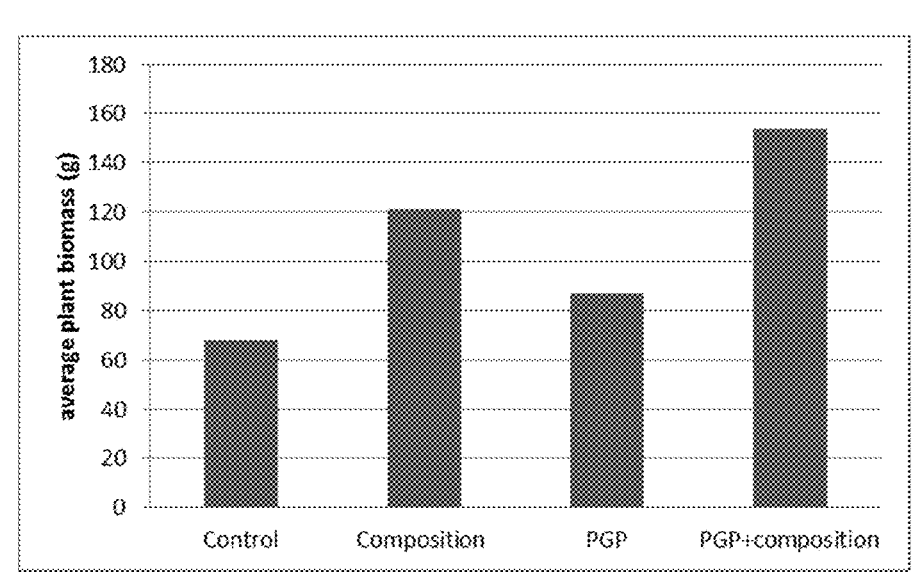
Figure 2:
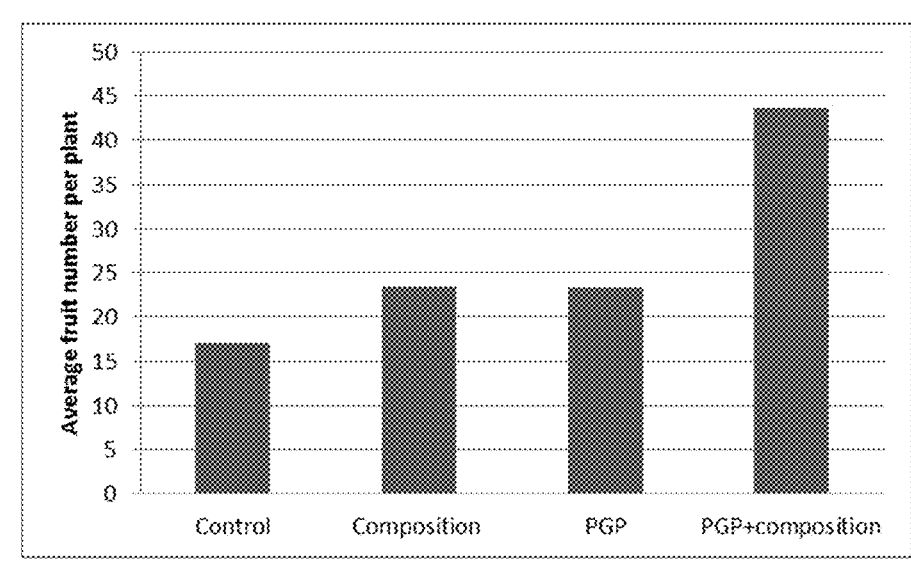

FIG. 2: shows the efficacy of the composition of present invention on lettuce (FIG. 2A) in terms of total plant biomass and soybean (FIG. 2B) in terms of average fruit number per plant. Plants were treated with the composition of the present invention, plant growth promoting bacteria, or with both. The total plant biomass of lettuce increased when the composition was added to the plant. When the composition of present invention was combined with PGP the synergistic effect was observed as an increased plant biomass in both lettuce and an increase in the average fruit number per plant in soybean.

Figure 3:
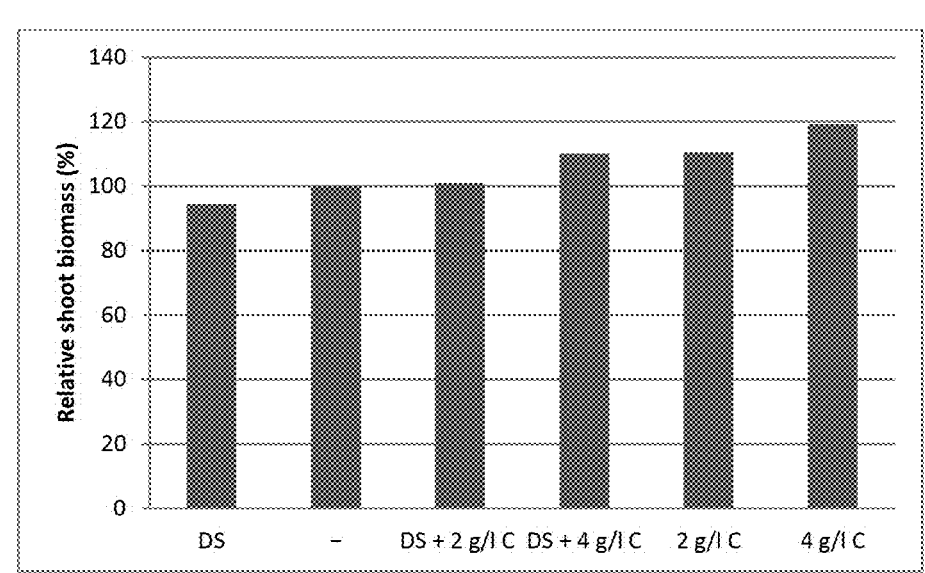
Figure 3:
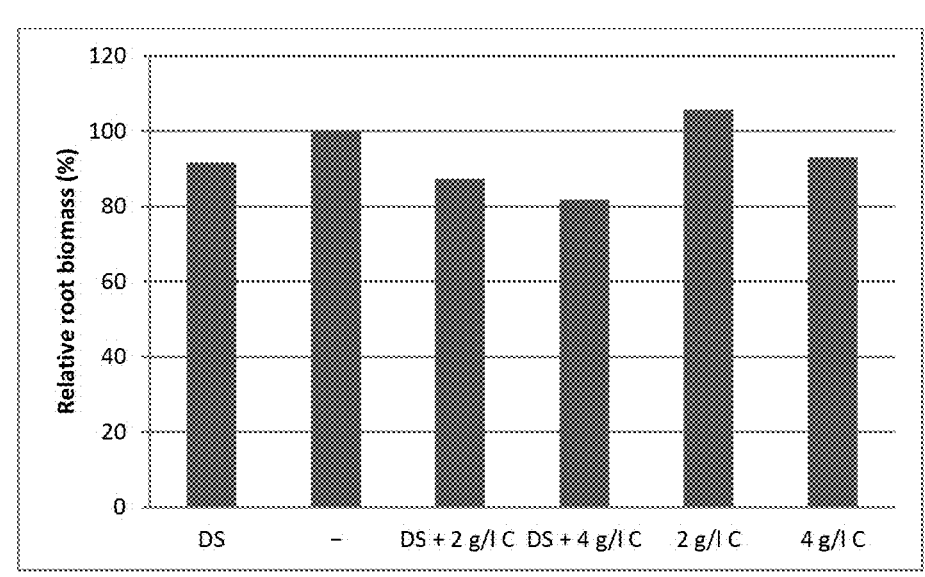

FIG. 3: shows the efficacy of the composition of present invention to provide plant bio stimulation in relation to improved drought stress tolerance of lettuce plants using different concentrations of the composition of present invention. The composition of present invention provided a positive effect during drought conditions on the shoot biomass of lettuce, showing a significant increase in shoot biomass during drought conditions as compared to plants that did not receive the composition (FIG. 3A). This improved drought tolerance is less pronounced in root biomass of the lettuce plant (FIG. 3B), although a bio stimulant effect is observed under normal (non drought stress) conditions for the root biomass.

Figure 4:
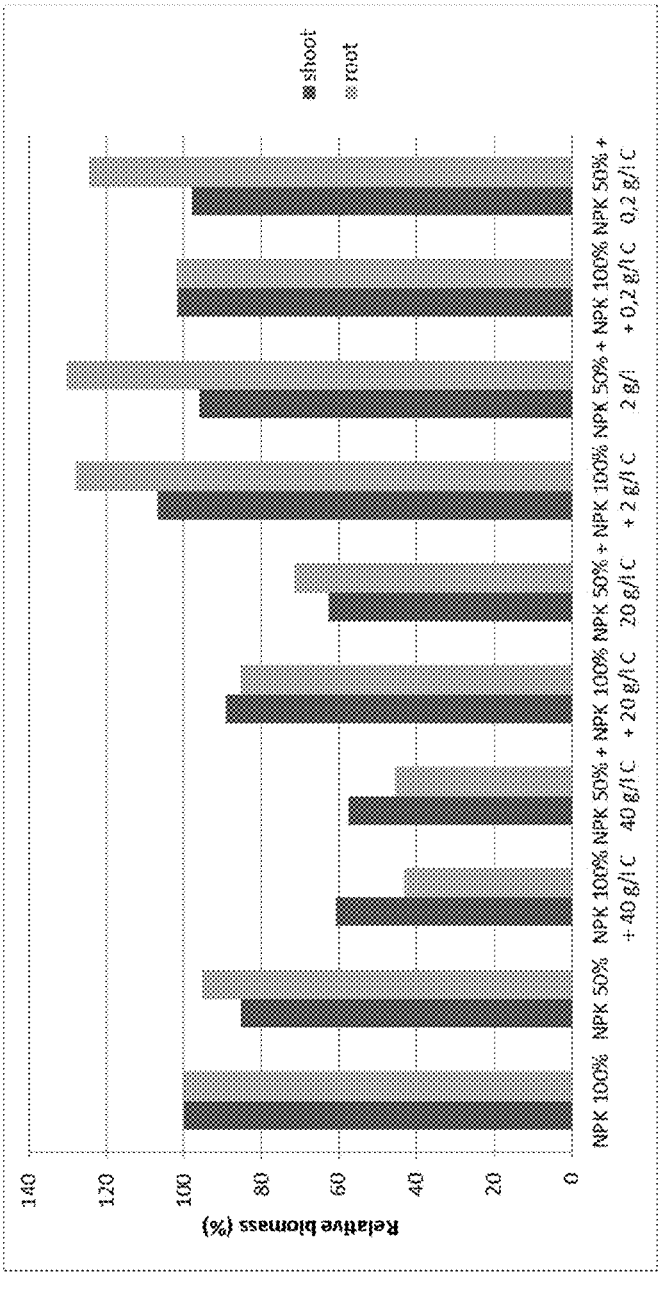

FIG. 4: shows the efficacy off the composition at various dosages to provide plant bio stimulation in relation to reduced nutrient availability. Soybean plants were cultivated under reduced nutrient conditions and the effect on growth and root development of the composition during reduced nutrient availability was assessed. The composition was dosed to the plants in various concentrations. The control plants received 100% or 50% NPK without addition of the composition, and root and shoot biomass of the plants were determined.

EXAMPLES

Example 1—Production of Composition of Present Invention Derived from the Fermentation Effluent of Lactic Acid Bacteria The Lactic Acid Bacteria fermentation was performed in a liquid growth medium having the overall average composition: 1-3% of peptone; 0.4-3% yeast extract; 2-6% glucose; 0.5-1% sodium acetate trihydrate; 0.2-0.5% dipotassium hydrogen phosphate; 0.1% triammonium citrate; 0.02-0.04% magnesium sulfate heptahydrate; 0.005% manganese sulfate tetrahydrate; 0.002% iron sulfate, bases on the total weight of the liquid medium. The final volume of the medium used in fermentation depends on the scale of the fermentation and usually ranges from 1 to 40.000 litre. The initial medium pH is generally adjusted to between 5.0 and 7.0, depending on the specific LAB strain requests.

The fermentation temperature ranges between 25 and 45° C., according to the strain growth optimum, and the fermentation time varies between 5 and 24 hours, depending on the growth rate of the LAB strain. During the fermentation process, dissolved oxygen (optional), air flux (optional), mixing speed, pH, and sugar contents (optional) are monitored and kept over fixed values, which are LAB strain-dependent. Once the fermentation reaches the desired optical density, the broth medium is either cooled to about 4° C. and held prior to centrifugation or immediately centrifuged in order to separate the cells from the liquid used fermentation broth (indicated as effluent). The microbial biomass is continually discharged from the centrifuge, whilst the effluent is unloaded separately, and harvested in a collection tank.

Then, the effluent is heated and processed in a vacuum evaporator at 95° C. Over a working day, the process can concentrate over 54,000 litres of diluted effluent, obtaining approximately 5,400 litres of concentrated effluent. During this process, a clean 90% water fraction is recovered through distillation, and can potentially re-cycled for a vast range of applications. As a result, the concentrated effluent retains its agronomically relevant biochemical components, such as nitrogen-based molecules, amino-acids, organic acids, micro-nutrients, and more useful secondary metabolites produced by the LABs, such as bacterial enzymes and peptides. This substantial mix of organic compounds is able to nourish both the plant and/or its rhizospheric microbiome, and also will be useful to mobilize the inorganic soil nutrients, which otherwise would be unavailable and impossible to be absorbed by the plant roots.

Example 2—Efficacy of the Composition of Present Invention on Plant Biomass and Fruit Biomass To test the efficacy of the composition of the present invention in relation to the bio stimulatory effect on plant crops, lettuce (lettuce var. gentilina), tomato (tomato balcony sweet 'n' eat) and soybean plants were tested. Plants were cultivated in greenhouses (Quinto Vicentino-VI-Italy), not acclimatized, during the months of May and June, with natural light cycles, in 20 cm diameter pots. The temperature ranged from a minimum of 8-15° C. at night to a maximum of 23-39° C. during the light hours.

The plants were provided, via soil application, with the composition of the present invention and plant growth and plant health was monitored over time. Plant treatments were performed as follows. The concentrated composition derived from the LAB fermentation effluent was applied at 2 g/L dose rate and is comprising about 15 wt % lactic acid, 0.25 wt % of potassium, 5 wt % of ammonium, and 2 wt % phosphate, based on the total weight of the composition. Plants (15 plants, per crop) were provided twice with said composition: first, three weeks after germination, and then another time after two more weeks. The plants (15 plants, per crop) that did not receive the composition served as control. Other conditions, such as watering, light, soil conditions were identical between plants. The control plants received the sterile and unfermented broth. Furthermore, and additional group that was included were plants, next to the composition of present invention, received growth promoting bacteria (PGP). These bacteria (P. phytofirmans, A. brasilense and M. oryzae) were cultivated separately in individually fermentation broths, which were diluted to $10^6$ CFU/ml, and applied to the plants.

The biomass was measured for each plant, i.e. for lettuce the harvested fresh biomass corresponded to the whole above-ground vegetative fraction. For tomato and lettuce, the biomass was measured three weeks after the first application of the composition of present invention, and for soybean the measurements were done at the end of soybean life-cycle (e.g. at leaf senescence). In addition to the total biomass of the plant, for tomato the total fruit biomass per plant was determined in three independent tests. For soybean the total fruit number was determined. See FIGS. 1 (tomato) and 2 (lettuce (A) and soybean (B)) for the results.

FIG. 1 shows the results of the tomato plants from which it can be concluded that when the composition of the present invention is applied to the tomato plant, the overall biomass of the plants increases. In case the composition of present invention is combined with PGPB's a synergistic effect is observed wherein the plant biomass is increased even more than when PGPB or the composition of present invention is added separately. When looking at the fruit biomass, also there a similar trend is observed where the composition of present invention results in a significant increase in fruit biomass, and even greater when combined with PGPB.

FIG. 2A shows the effect of the composition of present invention on lettuce plants (FIG. 2A) and soybean (FIG. 2B). The total plant biomass of lettuce increases when the composition is added to the plant. Remarkable, the biomass increase with the composition of present invention is even higher than when the plant is cultivated in the presence of PGPB's. When the composition of the present invention is combined with PGPB the synergistic effect on increased plant biomass is more pronounced than was observed with tomato. Finally, the effect of the composition was observed for soybean in relation to the number of fruits, FIG. 2B. The results were comparable with the biomass increase observed in tomato and lettuce, as the addition of the composition of present invention to soybean plant resulted in an increase in the number of soybeans per plant. The synergistic effect of the combination of the composition of present intention with PGPB was even more pronounced as compared with lettuce.

Example 3—Efficacy of the Composition of Present Invention on Drought Stress Tolerance and Reduced Nutrient Availability for Lettuce, Soybean and Tomato Plants Next, the efficacy of the composition of the present invention to provide plant bio stimulation in relation to improved drought stress tolerance of lettuce plants (lettuce var. gentilina) was tested. Furthermore, the efficacy of the composition of the present invention to provide plant bio stimulation was tested in relation to improved tolerance during reduced nutrient availability for soybean and tomato (Example 4 and 5 below).

Plants were cultivated in greenhouses (Quinto Vicentino-VI-Italy), not acclimatized, during the months of May and June, with natural light cycles. The temperature ranged from a minimum of 8-15° C. at night to a maximum of 23-39° C. during light hours. Lettuce plants (252 plants) were cultivated in 1 L pots (7×7×18 cm) covered by a layer of polystyrene to avoid excessive temperature fluctuations. Twenty-five pots were weighed before the beginning of the trial, to follow the water status of plants over time during the trial and to impose a proper drought stress when desired. The nutrients and the composition of the present invention were applied plant-by-plant via fertigation. The composition was provided at two dosages (2 g/L and 4 g/L) at 5 days before induction of drought stress and at the start of induction of drought stress, and plant growth and plant health was monitored over time. Drought stress was induced for four days by maintaining water amounts in the pots between 30-50%, as compared to control plants being regularly watered. After induction of drought stress, plants were regularly watered until the end of the trial, five days after the induction of drought stress. At the end of the trail, analysis of the plant root and shoot biomass was performed; see Table 1 and FIG. 3. The root and shoot biomass values (g) in Table 1 represent the average biomass per lettuce plant (per pot).

TABLE 1

| Lettuce | shoot average (g) | root average (g) |
| --- | --- | --- |
| +DS | 32.7 | 7.9 |
| – | 34.7 | 8.6 |
| +DS + 2 g/l C | 35.0 | 7.5 |
| +DS + 4 g/l C | 38.2 | 7.0 |
| +2 g/l C | 38.3 | 9.1 |
| +4 g/l C | 41.3 | 8.0 |

* DS = drought stress,
C = composition of invention

The composition dosed at 2 g/l and comprises about 15 wt % lactic acid, 0.25 wt % of potassium, 5 wt % of ammonium, and 2 wt % phosphate, based on the total weight of the composition and provided a positive effect during drought conditions on the shoot biomass of lettuce, showing a significant increase in shoot biomass during drought conditions as compared to plants that did not receive the composition (See also FIG. 3A). This improved drought tolerance observed with the shoot biomass is not as clear as with the root biomass of the lettuce plant (See also FIG. 3B). Although a bio stimulant effect is observed under normal (non-drought stress) conditions for the root biomass. Furthermore, it seems that the more concentrated dosage (4 g/l) has reduced efficacy, especially when looking at the root biomass of lettuce. Dosages ranging from 0.2 up to 40 g/l have been tested and high dosages such as 20 to 40 g/l show to an adverse affect on plant growth and health (data not shown). It seems that about 2 g/l, comprising about 15 wt % lactic acid, 0.25 wt % of potassium, 5 wt % of ammonium, and 2 wt % phosphate based on the total weight of the composition, is optimal to provide a bio stimulant effect to the plant.

Example 4—Efficacy of the Composition of the Present Invention on Growth and Root Development During Reduced Nutrient Availability for Soybean Plants Soybean plants (200 plants in total) were cultivated under reduced nutrient conditions to test for the bio stimulating activity and evaluate the effect of the product on growth and root development of the composition of the present invention during reduced nutrient availability. To eliminate the "soil factor", as well as consider the activity on the vegetative growth of soybeans, the tests have been performed under hydroponic conditions. Briefly, soy seeds were surface-sterilized in 80% ethanol and 3% sodium hypochlorite and rinsed 5 times, then sown on a double-layered filter paper moistened with 4 ml sterile water and let to germinate in the dark at a constant temperature of 26° C. After two-three days, homogenously germinated seeds were planted in a 0.5% agar support in a hydroponic system (high density Araponics® system) filled with water. Seedlings were grown for 3-4 days, until a hypocotyl >4 cm was present.

As nutrient solution, Hoagland solution was used (hydroponic nutrient solution), wherein a ⅕ dilution was regarded as 100% nutrient provision (Nitrogen-Phosphorus-Potassium, NPK), and ¹⁄₁₀ dilution was 50% NPK. Furthermore, the composition was added to the plants at dosages 0.2, 2, 20 and g/l, as indicated earlier. The control plants received 100% or 50% NPK without addition of the composition. Plants were treated at root level by soaking them for four hours in a solution comprising the composition of present invention at the indicated concentrations. After soaking the plants, they were transferred to hydroponic conditions in the indicated nutrient solution for 10 days at constant temperature in 16 hours of light and 8 hours of darkness photoperiod in a phytotron. After this cultivation period, root and shoot biomass of the plants was determined, see FIG. 4. Results show that high concentrations (>20 g/l) of the composition (C) negatively affect the plant growth, showing a reduction in both root and shoot biomass. At a dosage of 2 g/l of the composition comprising about 15 wt % lactic acid, 0.25 wt % of potassium, 5 wt % of ammonium, and 2 wt % phosphate based on the total weight of the composition, a strong bio stimulant effect was observed when plants were subjected to reduced nutrient availability, showing a strong increase in both the root and shoot biomass in soybean at 50% NPK. At 100% NPK and low concentrations (2 g/l or lower) no negative effects were observed on both root and shoot biomass production.

Example 5—Efficacy of the Composition of the Present Invention on Growth and Root Development During Reduced Nutrient Availability for Tomato Plants Next to the soybean, also in tomato plants (80 plants), the bio stimulant effect was assessed under nutrient reduced conditions attributed the composition of present invention. Briefly, tomato plants (tomato balcony sweet 'n' eat) were cultivated in a greenhouse in 3L pots, covered by a layer of polystyrene to avoid excessive temperature fluctuations. The temperature ranged from a minimum of 8-15° C. at night to a maximum of 23-39° C. during light hours. Plants were provided, via soil application, with different nitrogen provision (100% N, 95% N and 70% N) and with/without the composition of present invention comprising 15 wt % lactic acid, 0.25 wt % of potassium, 5 wt % of ammonium, and 2 wt % phosphate based on the total weight of the composition, to compensate for the % reduction in nitrogen, i.e. 5% and 30% of the requested N present in the composition of present invention. Plants were fertigated with the different nitrogen provision according to table 2 below and the relative entries 5% N and 30% N with the composition relate to 0.09 g and 0.54 g of the composition of the present invention per plant.

TABLE 2

| Nitrogen provision | NPK provided (g, per plant) | | |
| --- | --- | --- | --- |
| | N | $P_2O_5$ | $K_2O$ |
| N 100% | 101.3 | 50.6 | 210.9 |
| N 95% | 96.2 | 50.6 | 210.9 |
| N 70% | 70.9 | 50.6 | 210.9 |

Fruit production was assessed after 90 days of growth by harvesting fully ripened fruits. Non-ripened fruits were also harvested, so as to consider the full production potential of plants in relation to the composition of the present invention. The average fruit weight and average number of fruits per plant at the end of the trial was assessed, and results are shown below in Table 3.

TABLE 3

| Nutrient provision | number of ripened fruits | weight of ripened fruits (g) | number of unripe fruits | weight of unripe fruits (g) |
|---|---|---|---|---|
| N 100% | 39.2 | 351.8 | 27.3 | 118.5 |
| N 70% | 40.9 | 370.6 | 23.6 | 73.2 |
| N 95% | 40.6 | 380.0 | 34.0 | 145.0 |
| N 70% + 30% comp. | 40.1 | 361.7 | 38.8 | 163.3 |
| N 95% + 5% comp. | 38.6 | 351.4 | 32.0 | 149.8 |

Results show that the reduction of nutrients can be completely counteracted by addition of the composition of the present invention, improving the fruit production of the plant (in numbers and size). The bio stimulant effect was especially observed in the young, green tomatoes that will ripen later in the season towards tomatoes that are ready for commercial harvest. When tomatoes became riper and closer to harvest, the bio stimulant effect was less pronounced. This may indicate that the composition does not anticipate fruit production or ripening, but it positively affects the total quantity of produced fruits and is especially suitable during the growth and development stages of the plant and its fruits. These results further indicate that the use of the present invention can reduce the use of chemical fertilizers during the whole cycle of tomato production.

The invention claimed is:

1. A composition for bio stimulation of plants, wherein the composition is an aqueous solution comprising between 5 to 30 wt % lactic acid, between 0.05 to 2 wt % of potassium or potassium based compounds, and between 2 to 10 wt % of ammonium or ammonium comprising compounds, and between 0.2 to 5 wt % phosphate or phosphate comprising compounds, based on the total weight of the composition, wherein the composition is derived from the fermentation effluent of lactic acid bacteria, and wherein the fermentation effluent of lactic acid bacteria is from a submerged fermentation process.

2. The composition for bio stimulation of plants according to claim 1, wherein the composition is further comprised of between 0.1 to 1 g/kg calcium, and/or between 0.07 to 0.2 mg/kg iron, and/or between 0.06 to 0.16 mg/kg tryptophan, based on the total weight of the composition.

3. The composition according to claim 1, wherein the composition further comprises one or more substances selected from the group consisting of di-ketopiperazines, 3-phenyllactate, bacteriocins, 3-Phenylpropanoicacid, (E)-2-Methylcinnamic acid, cytidine, deoxycytidine, sodiumdecanoate, cyclo(L-Met-L-Pro), cyclo(L-Pro-L-Pro), cyclo(L-Tyr-L-Pro), cyclo(L-His-L-Pro), hydrogen peroxide, pyrrolidone-5-carboxylic acid, diacetyl, reuterin.

4. The composition according to claim 1, wherein the composition further comprises plant growth promoting bacteria selected from the group consisting of *Rhizobacteria, Gluconacetobacter, Burkholderia, Klebsiella, Azoarcus, Azospirillum, Bacillus, Pseudomonas, Serratia, Thiobacillus, Azospirillum brasilense, Paraburkholderia phytofirmans,* or *Methylobacterium oryzae.*

5. The composition according to claim 1, wherein the composition is free of synthetic products.

6. The composition according to claim 1, wherein the lactic acid bacteria are one or more selected from the group consisting of *Lactobacillus, Leuconostoc, Pediococcus, Lactococcus, Streptococcus, Aerococcus, Carnobacterium, Enterococcus, Oenococcus, Sporolactobacillus, Tetragenococcus, Vagococcus,* and *Weissella.*

7. A method for the bio stimulation of plants, wherein the plants are provided with the composition of claim 1.

8. The method for the bio stimulation of plants according to claim 7, wherein the composition is provided to the plants via foliar or soil application.

9. The method for the bio stimulation of plants according to claim 7, wherein the composition is free of live lactic acid bacteria and/or further comprises inactivated lactic acid bacteria before being provided to the plants.

10. The method for the bio stimulation of plants according to claim 7, wherein the plant is one or more selected from the group consisting of lettuce, tomato, soybean, corn, pepper, and cabbage.

11. The method for the bio stimulation of plants according to claim 7, wherein the bio stimulation is one or more selected from the group consisting of improved plant growth, improved crop growth, increased drought tolerance, improved stress recovery, as compared to a plant not provided with the composition of present invention.

* * * * *